United States Patent
McNew et al.

(10) Patent No.: US 7,813,371 B2
(45) Date of Patent: Oct. 12, 2010

(54) SYSTEM AND METHOD FOR SHORT RANGE COMMUNICATION USING ADAPTIVE CHANNEL INTERVALS

(75) Inventors: Justin Paul McNew, Del Mar, CA (US); John Thomas Moring, Encinitas, CA (US); Khaled I. Dessouky, Studio City, CA (US)

(73) Assignee: Kapsch Trafficcom AG, Vienna (AT)

( * ) Notice: Subject to any disclaimer, the term of this patent is extended or adjusted under 35 U.S.C. 154(b) by 286 days.

(21) Appl. No.: 11/852,054

(22) Filed: Sep. 7, 2007

(65) Prior Publication Data

US 2008/0232433 A1    Sep. 25, 2008

Related U.S. Application Data

(60) Provisional application No. 60/896,169, filed on Mar. 21, 2007.

(51) Int. Cl.
*H04L 12/28* (2006.01)
*H04B 7/00* (2006.01)

(52) U.S. Cl. ............... 370/431; 370/328; 370/329; 370/332; 455/41.2; 455/62; 455/509; 455/512

(58) Field of Classification Search .......... 370/264, 370/270, 315, 328, 329, 332, 339, 432, 433; 340/905; 375/346, 358, 267; 701/24, 205, 701/301, 302; 455/41.2, 512, 515, 24, 205, 455/301, 302, 62, 509, 518–521

See application file for complete search history.

(56) References Cited

U.S. PATENT DOCUMENTS

| 4,004,884 | A | * | 1/1977 | Zdrodowski | 137/624.18 |
|---|---|---|---|---|---|
| 4,935,927 | A | * | 6/1990 | Kaewell et al. | 370/506 |
| 5,371,734 | A | * | 12/1994 | Fischer | 370/311 |
| 5,420,851 | A | * | 5/1995 | Seshadri et al. | 370/280 |
| 5,831,976 | A | * | 11/1998 | Lin et al. | 370/329 |
| 6,405,132 | B1 | * | 6/2002 | Breed et al. | 701/301 |
| 6,470,057 | B1 | * | 10/2002 | Hui et al. | 375/294 |
| 6,771,706 | B2 | * | 8/2004 | Ling et al. | 375/267 |
| 6,829,531 | B2 | * | 12/2004 | Lee | 701/205 |
| 6,882,658 | B1 | * | 4/2005 | Rudd et al. | 370/442 |
| 6,895,255 | B1 | * | 5/2005 | Bridgelall | 455/552.1 |
| 6,917,811 | B2 | * | 7/2005 | Kim et al. | 455/452.1 |
| 6,952,157 | B1 | * | 10/2005 | Stewart et al. | 340/10.2 |

(Continued)

OTHER PUBLICATIONS

"Wireless LAN extensions for vehicular environments and the control channel capacity", Jun Liu; McNew, J.; Trerotola, R.; Vehicular Technology Conference, 2004. VTC2004-Fall. 2004 IEEE 60th vol. 5, Sep. 26-29, 2004 pp. 3210-3213 vol. 5.*

*Primary Examiner*—Aung S Moe
*Assistant Examiner*—Benjamin Elliott
(74) *Attorney, Agent, or Firm*—Christie, Parker & Hale LLP

(57) ABSTRACT

A system and method for data transmission on wireless discontinuous channels including a control/safety information (CSI) channel having a duty cycle, and a plurality of service channels. The system and method include: evaluating channel utilization of one or more of the channels; calculating an optimal CSI channel duty cycle responsive to the channel utilizations; adjusting the duty cycle of the CSI channel to the calculated optimal CSI channel duty cycle; broadcasting the optimal CSI channel duty cycle; and transmitting data during the optimal CSI channel duty cycle.

23 Claims, 5 Drawing Sheets

U.S. PATENT DOCUMENTS

| | | | |
|---|---|---|---|
| 7,046,651 B2* | 5/2006 | Terry | 370/338 |
| 7,221,653 B2* | 5/2007 | Vanghi | 370/252 |
| 7,359,311 B1* | 4/2008 | Paranjpe et al. | 370/203 |
| 7,430,256 B2* | 9/2008 | Zhidkov | 375/346 |
| 2003/0009765 A1* | 1/2003 | Linden et al. | 725/95 |
| 2003/0058929 A1* | 3/2003 | Cox et al. | 375/150 |
| 2004/0029558 A1* | 2/2004 | Liu | 455/404.2 |
| 2004/0151145 A1* | 8/2004 | Hammerschmidt | 370/338 |
| 2004/0196871 A1* | 10/2004 | Terry | 370/477 |
| 2005/0002326 A1* | 1/2005 | Ling et al. | 370/208 |
| 2005/0025093 A1* | 2/2005 | Yun et al. | 370/328 |
| 2005/0057291 A1* | 3/2005 | Nguyen et al. | 327/175 |
| 2005/0164730 A1* | 7/2005 | Chen et al. | 455/522 |
| 2006/0013182 A1* | 1/2006 | Balasubramanian et al. | 370/343 |
| 2006/0182206 A1* | 8/2006 | Coon et al. | 375/346 |
| 2007/0082658 A1* | 4/2007 | Tengler et al. | 455/413 |
| 2007/0223412 A1* | 9/2007 | Lott | 370/310.1 |
| 2007/0299571 A1* | 12/2007 | Laberteaux et al. | 701/24 |
| 2008/0159458 A1* | 7/2008 | Cheng et al. | 375/358 |
| 2008/0186893 A1* | 8/2008 | Kolding et al. | 370/311 |
| 2008/0232433 A1* | 9/2008 | McNew et al. | 375/140 |
| 2009/0067448 A1* | 3/2009 | Stanwood et al. | 370/447 |

* cited by examiner

SYSTEM AND METHOD FOR SHORT RANGE COMMUNICATION USING ADAPTIVE CHANNEL INTERVALS

CROSS-REFERENCE TO RELATED APPLICATIONS

This Patent Application claims the benefit of the filing date of U.S. Provisional Patent Application Ser. No. 60/896,169, filed on Mar. 21, 2007 and entitled "SYSTEM AND METHOD FOR SHORT RANGE COMMUNICATION USING ADAPTIVE CHANNEL INTERVALS," the entire content of which is hereby expressly incorporated by reference.

FIELD OF THE INVENTION

The present invention relates to the field of data transmission on wireless discontinuous channels, particularly applied to vehicular systems such as those operating within the constraints of Dedicated Short Range Communications (DSRC) and Wireless Access in Vehicular Environments (WAVE).

BACKGROUND

References IEEE P1609.4, Draft Standard for Wireless Access in Vehicular Environments (WAVE) Multi-Channel Operation—DRAFT STANDARD [1]; IEEE P1609.3—Wireless Access in Vehicular Environments (WAVE) Network Services—DRAFT STANDARD [2]; and IEEE Std. 802.11p, Information technology—Telecommunications and information exchange between systems—Local and metropolitan area networks—Specific requirements—Part 11: Wireless LAN Medium Access Control (MAC) and Physical Layer (PHY) specifications: Wireless Access in Vehicular Environments (WAVE)—DRAFT STANDARD [3] specify a wireless communications system comprised of vehicular and roadside units. The units exchange both high priority/low latency data (e.g., emergency warnings), and low priority/best effort data (e.g., map updates). They employ a series of radio channels in the 5 GHz band, one of which is designated a control/safety information (CSI) channel and others designated service channels. All devices are required to periodically tune to the CSI channel to exchange information of general interest. At other times, devices may operate on any of the service channels to exchange information of interest to a subset of the devices. These times are known as the CSI channel interval and service channel interval respectively.

Typically, Dedicated Short Range Communications (DSRC) or Wireless Access in Vehicular Environments (WAVE) systems use the CSI channel for two purposes: setting up data exchange sessions on a service channel and transmission of time-critical emergency and safety messages among vehicles and between vehicles and infrastructure. These emergency and safety messages are used for applications that involve avoiding car crashes and other emergency situations, for instance transmitting traffic signal information to a vehicle from a roadway intersection, or brake warnings from one vehicle to another. Data exchanges on service channels typically involve applications used to process payments, for instance toll collection and parking lot payments. In the DSRC embodiment, the CSI and service channel intervals may be adapted to provide maximum utilization of the appropriate channel depending on the emergency and safety messages load on the CSI channel, or the data exchange load on the service channel, so that the demands of the respective load can be most effectively accommodated based on message traffic and transmitted time critical safety messages are not missed by the receiving devices.

In [1], the CSI channel and service channel intervals are assumed to be of constant duration. This provides a guaranteed grade of service to CSI channel and service channel traffic, however, it does not accommodate adjustments to the relative allocation of channel resources if a different allocation would provide better system utilization. For example, if service channel traffic only required 10% of the channel capacity, it would still consume 50% of that resource.

U.S. Pat. No. 3,564,147 describes a Demand Assigned Multiple Access (DAMA) system, which is specifically targeted for satellite communications, while this invention is targeted for terrestrial vehicular applications. However, in DAMA, channel resources are assigned by a control station, based on pre-configured information and/or user requests. Moreover, DAMA does not employ any dynamic service channel usage monitoring and does not adjust resource allocation based on actual system utilization.

Additionally, while DAMA is a multiple access control technology assigning system resources to specific devices or services, it does not segment channel resources available to participants.

Therefore, there is a need for an improved system and method for short range communication on wireless discontinuous channels, where the resource allocation is adjusted based on actual system utilization.

SUMMARY

The present invention more efficiently uses the available channel resources, that is, it provides a higher grade of service to users. This is achieved by adapting channel timing to improve communication throughput and latency metrics for a given class of traffic, while not sacrificing overall performance requirements for all traffic classes.

In some embodiments, the present invention is a system and method for data transmission on wireless discontinuous channels including a control/safety information (CSI) channel having a duty cycle, and a plurality of service channels. The system and method include: evaluating channel utilization of one or more of the channels; calculating an optimal CSI channel duty cycle responsive to the channel utilizations; adjusting the duty cycle of the CSI channel to the calculated optimal CSI channel duty cycle; broadcasting the optimal CSI channel duty cycle; and transmitting data during the optimal CSI channel duty cycle.

In some embodiments, the present invention is a system and method for adaptive channel switching in a Wireless Access in Vehicular Environments (WAVE) system including a control/safety information (CSI) channel and a plurality of service channels. The system and method include: calculating optimal channel switch timings based on utilization of the CSI channel and utilization of the plurality of service channels; broadcasting the calculated optimal channel switching times in a service advertisement; adjusting channel switch timings to the calculated optimal channel switch timings; and transmitting and receiving data during the optimal channel intervals.

DETAILED DESCRIPTION

Figure 1:
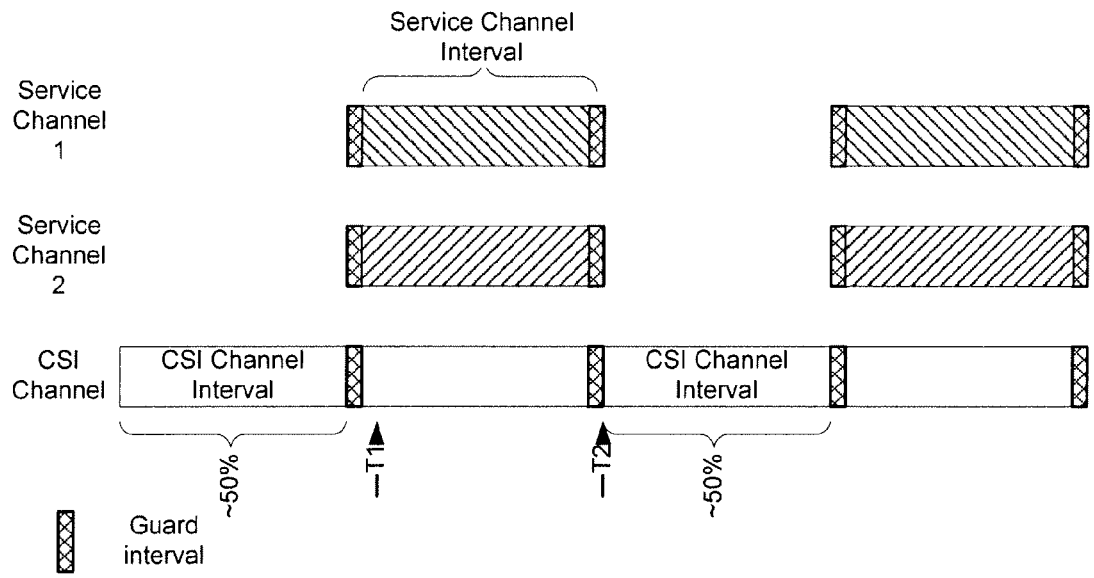
FIG. 1. shows a traditional CSI channel timing and service channel intervals with the nominal 50% duty cycle.

Channel timing of a traditional system described in [1] is illustrated in FIG. 1. Nominally 50% of the time (e.g., 50 ms of every 100 ms) is the CSI (control) channel interval, and all devices tune to the CSI channel for high-criticality traffic of general interest. During the other 50% of the time, devices may tune to service channels to participate in special-interest services. Subsets of devices may tune to different service channels on different radio frequencies (service channel 1 and service channel 2 in the example) for different services, but all use the same timing. Operation encompassing each service channel is known as a service set. There is a short guard interval between each CSI channel interval and service channel interval, to accommodate radio channel tuning and during which transmissions are not allowed. Devices not participating in a service set may remain tuned to, and operating on, the CSI channel. However, during the service channel interval, CSI channel transmissions are disadvantaged because potential receivers may be off operating on a service channel.

As shown in FIG. 1, the CSI channel is allocated 50% of the system time (minus the guard time). Devices participating on a service set are allocated another 50% (minus guard time) for service channel operation. Besides device throughput, message latency is also affected by the allocation. For example, a message arriving at the system at time T1 to be transmitted (or received) by a device tuned to a service channel, can not possibly be delivered until at least time T2.

Figure 2:
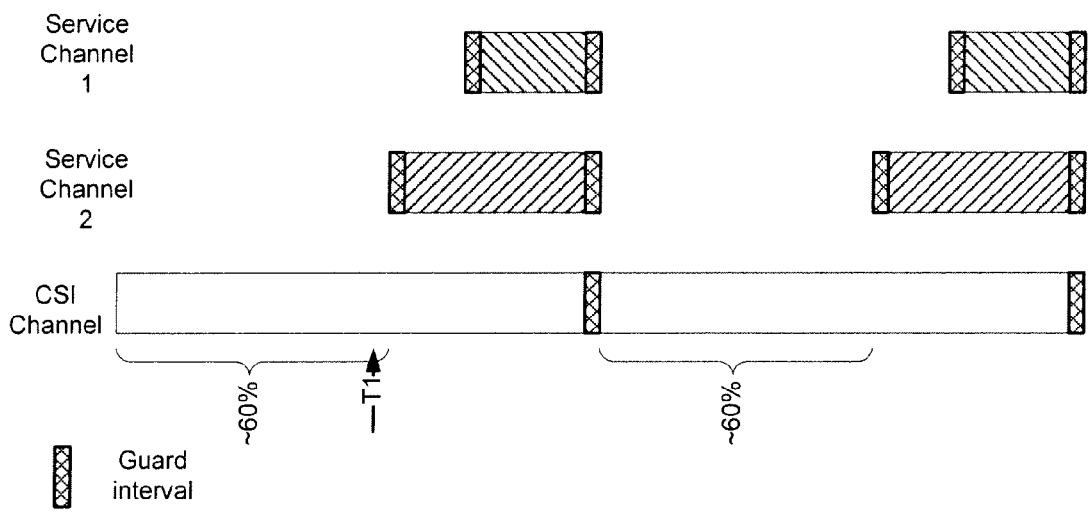
FIG. 2. shows an optimized channel timing example where the CSI channel interval has been increased to 60% of the total interval.

Now, consider the adaptive channel intervals of FIG. 2. As shown, the interval associated with service channel 1 is allocated 30% duty cycle, and the interval associated with service channel 2 is allocated 40% duty cycle. This increases the capacity of the CSI (control) channel since 60% of the time, all devices are available to send and receive on it. The adaptive channel intervals also decrease the average and maximum latency of CSI channel messages. In this example, the same message arriving at time T1 can be immediately delivered on the CSI channel, rather than waiting until T2, as shown in FIG. 1. The quality of service (throughput and latency) of the two service sets are negatively impacted, but there are numerous services that can tolerate lower throughput and higher latency.

In one embodiment, the invention is a system and method for adjusting the duration of radio channel intervals based on dynamic system characteristics, to provide an increase in effective system data throughput and latency performance. The invention maximizes quality of service (maximum throughput and minimum latency) to higher priority (e.g., control channel) traffic while providing acceptable grade of service to lower priority (e.g., service channel) traffic. Higher channel quality of service is correlated with a higher channel duty cycle.

Figure 3:
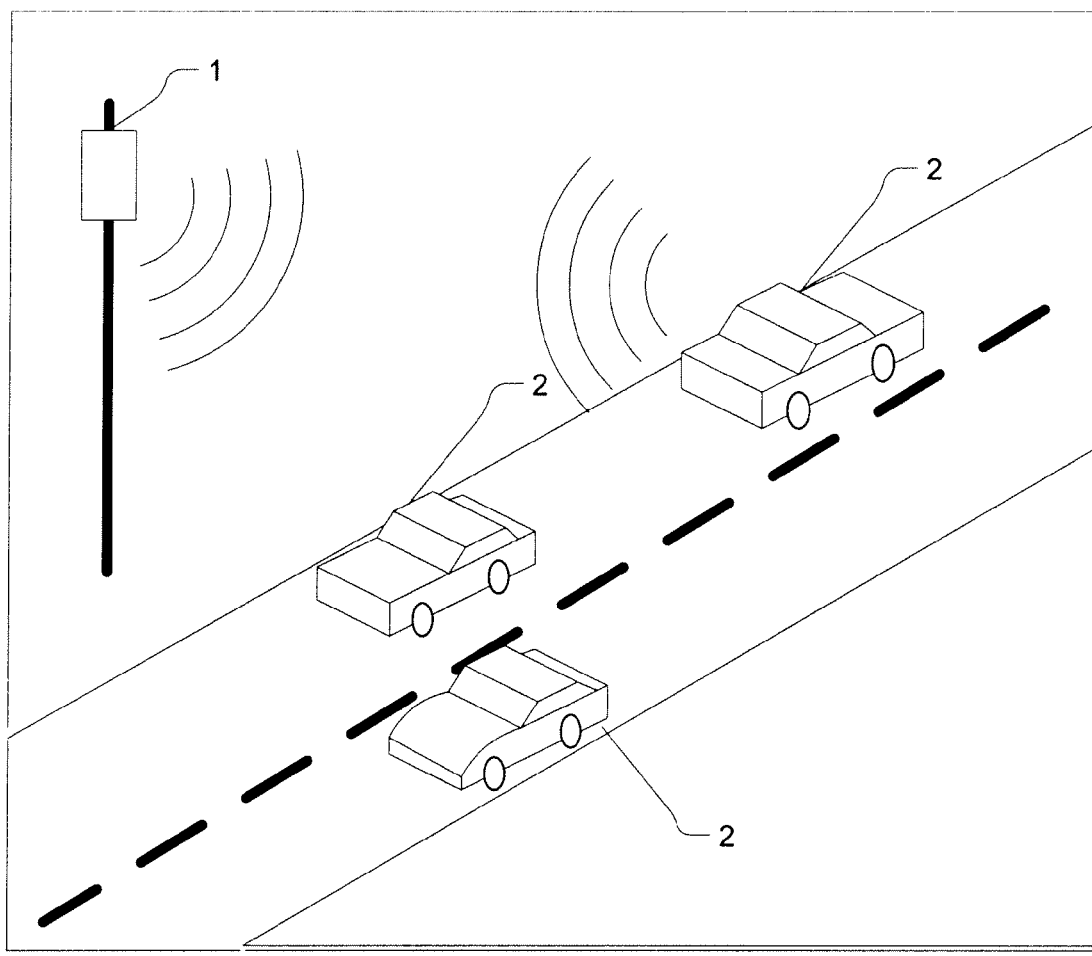
FIG. 3. illustrates a concept of operations for a WAVE system, including a fixed roadside unit and multiple vehicular onboard units, according to some embodiments of the present invention.

In one embodiment, the system of the present invention includes two device roles, channel controller and participant, both utilizing processors and channel-switching radios. Communications take place among participants, and between a channel controller and participants. In one embodiment, the channel controller role is performed by a roadside unit mounted in a fixed location. In this embodiment, the participant role is assumed by mobile units mounted in vehicles, as shown in FIG. 3. The CSI channel carries high-criticality traffic such as emergency warning, whereas service channels typically are used for lower-criticality traffic, or traffic of interest to a subset of the devices. Devices tune to the CSI channel at known times to exchange high-criticality traffic, and at other times may tune to one of the service channels for other traffic exchange. The channels are discontinuous, e.g., due to the transmitting unit switching to a different radio channel or due to predetermined system access constraints. Discontinuous channels may result from system access constraints including device limitations, reduced power consumption, interference mitigation, or others.

The channel controller periodically broadcasts system information (such as parameters needed for accessing the Internet) in a service advertisement. In one embodiment, the channel controller additionally calculates the optimal CSI channel duty cycle and broadcasts it in the service advertisement. The optimal duty cycle calculation takes into account some or all of the following parameters: configuration parameters manually entered into the system (e.g., maximum allowable CSI channel response time); data on the recent utilization of the CSI channel; data on the recent utilization of the service channels; current service channel allocation requests from applications utilizing the system; and/or relative priority of the services on the CSI and service channels.

A higher CSI channel duty cycle provides more of the system capacity to the control channel, resulting in higher throughput and lower response times for CSI channel traffic. A lower CSI channel duty cycle frees system capacity for service channel traffic when the capacity is not needed for CSI channel traffic. The channel controller and participants use the advertised CSI channel duty cycle parameter to control the timing at which they switch between the CSI channel and the service channel.

Figure 4:
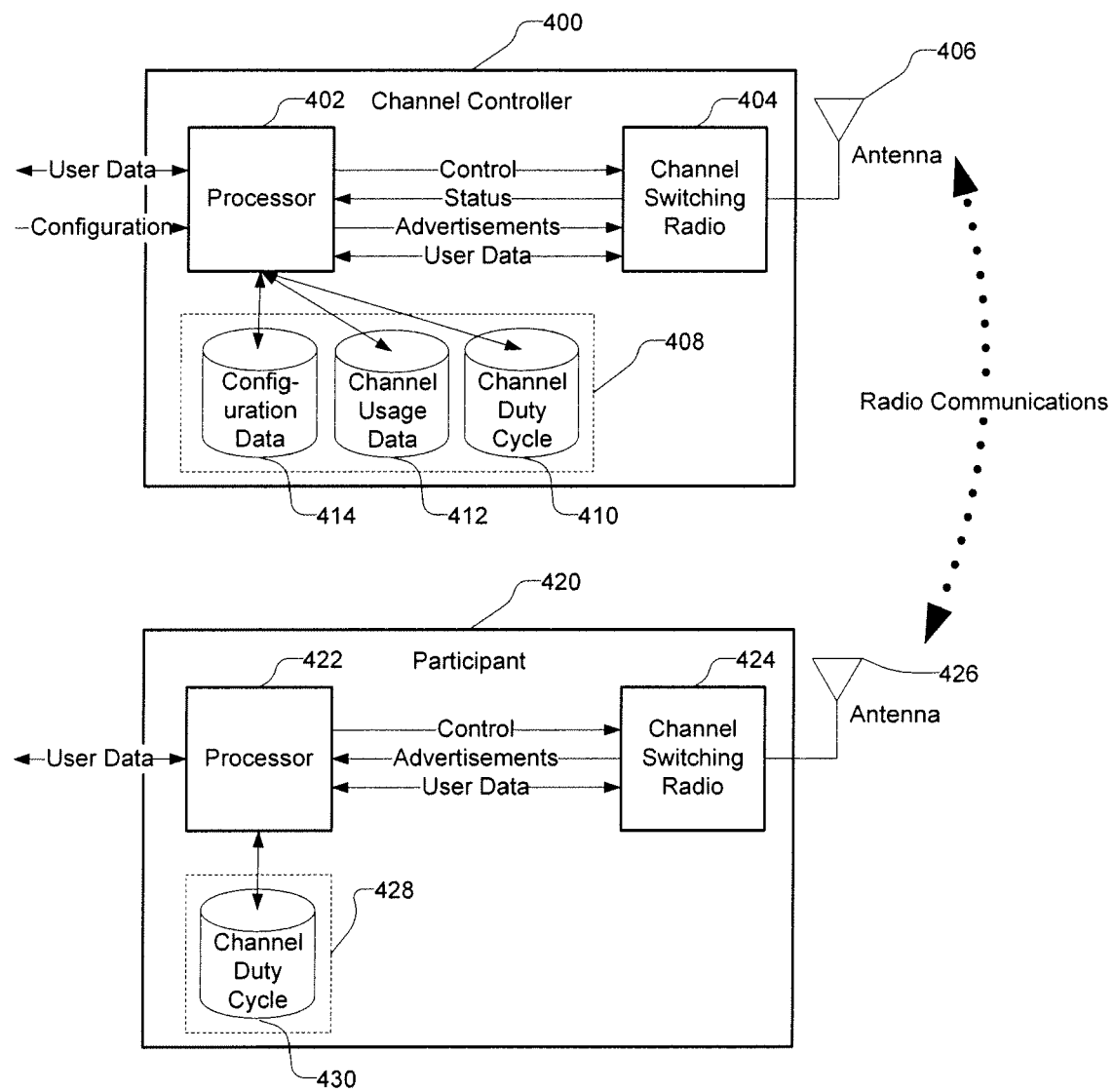
FIG. 4. depicts an exemplary block diagram for a channel controller and a participant device, according to some embodiments of the present invention.

FIG. 4. depicts an exemplary block diagram for a system including a channel controller (device) 420 and a participant (device) 400, according to some embodiments of the present invention. As shown, the system includes components in the channel controller device and the participant device. Note that the physical embodiment of the two roles could be identical, though their functions are distinct. In fact, in some embodiments, the role of a given device (channel controller or participant) could change over time.

As shown, each device includes a processing element (402 and 422) that handles general communications tasks, as well as the processes associated with the present invention. In the participant device 420, the processor 422 accepts the channel duty cycle advertisement from the channel controller and causes the radio to send and receive data at times and frequencies consistent with the received duty cycle. The processor 402 at the channel controller 400 monitors the channel usage, calculates the optimal duty cycle, and generates advertisements regarding the duty cycle, as well as causing the radio to send and receive data at times and frequencies consistent with the current duty cycle Each of the channel switching radio 404 and 424 is capable of operating on a plurality of radio frequency channels. It is also capable of receiving and sending transmissions on each of the channels utilizing an antenna (406 or 426).

A read/write memory (408 or 428) is used by a respective processor to store data of importance to the operation of the invention. The current channel duty cycle (410 and 430) is stored at each device. In addition, the channel controller 400 stores channel usage data 412 and configuration data 414 pertinent to its channel duty cycle calculations.

Standard electronic interfaces (not shown) connect the components internal to each device. External interfaces allow input and output of user communication data and device configuration data. Furthermore, each device may incorporate other components and functions not directly pertinent to the present invention.

In some embodiments, the invention encompasses multiple possible methods for accomplishing adaptive channel allocation. For example, in a centralized mode, the channel controller calculates an optimal duty cycle for all service sets in its service area (e.g., the area of its radio coverage in which other devices are under its control for this function) and broadcasts it in an advertisement message.

In the centralized mode, a device acting as a channel controller (e.g., a roadside unit) determines a CSI channel duty cycle to be used by all active service sets in the vicinity. (A service set as defined below is the operation encompassing a given service channel.) The CSI channel duty cycle is broadcast by the channel controller, and employed for any service set that is active in the vicinity. An example of CSI channel duty cycle parameter encoded with 4 bits is shown in Table 1 below. Other encodings could be used, for example, 8 bits would allow granularity of 1% rather than 10%.

TABLE 1

Example of CSI channel Duty Cycle Encoding using 4 Bits

| CSI channel Duty Cycle Parameter Value | CSI channel Duty Cycle |
|---|---|
| 1 | 10% |
| 2 | 20% |
| 3 | 30% |
| 4 | 40% |
| 5 | 50% |
| 6 | 60% |
| 7 | 70% |
| 8 | 80% |
| 9 | 90% |

Figure 5:
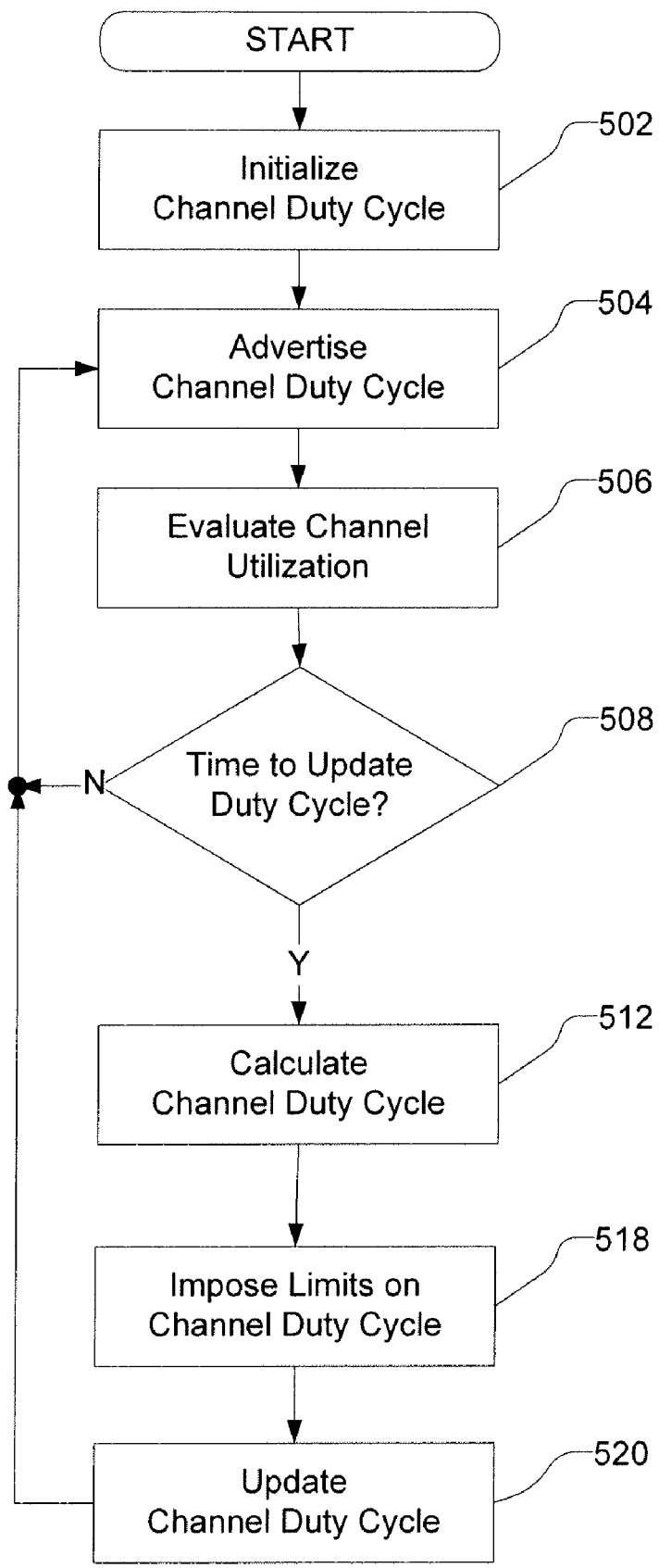
FIG. 5. depicts an exemplary process performed by a channel controller device, according to some embodiments of the present invention.

FIG. 5. depicts an exemplary process performed by a channel controller device, according to some embodiments of the present invention. On start-up, as shown in block 502, the channel controller initializes the CSI channel duty cycle to a predefined value (e.g., 50%) and begins advertising this CSI channel duty cycle, in block 504. In block 506, the channel controller regularly evaluates the utilization of the various radio channels in use in order to calculate the optimal CSI channel duty cycle. Note that for discussion purposes, the channel evaluation is shown as a discrete step in this sequence, but in practice it may occur at any time(s) in the process. The channel controller stores the evaluated usage data for later use in the CSI channel duty cycle calculation.

In block 512, the CSI channel duty cycle calculation is performed periodically, for example, once per CSI channel interval, or once per several CSI channel intervals, as controlled by the looping decision block 508. The calculation considers the current CSI channel duty cycle as well as the channel usage data, as described in more detail below. Before calculating the CSI channel duty cycle (block 512), the channel controller may (optionally) impose limits on the CSI channel duty cycle to ensure the parameter value is within the range established by the system configuration data in block 518. Typically, system policy provides minimum and maximum CSI channel duty cycle values that offer a minimum acceptable grade of service from a system perspective. Once the updated channel duty cycle has been finalized in block 520, it is used in subsequent advertisements until a new value is calculated at a future time. The updated CSI channel duty cycle is broadcast to the participant devices. The participant devices then use the updated CSI channel duty cycle to determine channel switching times.

Figure 6:
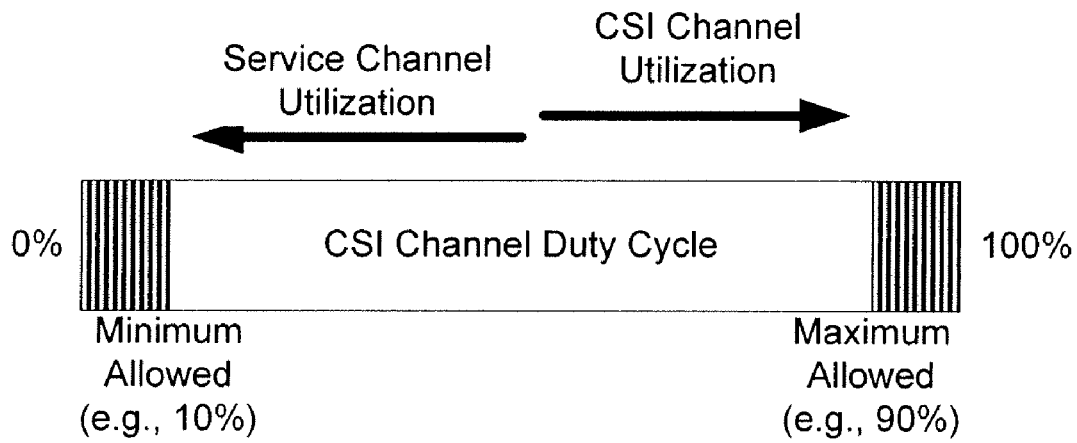
FIG. 6. illustrates exemplary factors that may influence optimal channel timing.

An exemplary process for updating the CSI channel duty cycle is illustrated in FIG. 6. High utilization of the CSI channel tends to cause the channel controller to increase the CSI channel duty cycle parameter value toward its maximum allowed value. High utilization of a service channel tends to cause the channel controller to decrease the CSI channel duty cycle parameter value toward its minimum allowed value, thereby increasing the service channel duty cycle.

This can be represented in the following equation:

$$CDC_{new} = CDC_{old} + (N*CCHU) - \max[(M_{SCH}*SCHU_{SCH})] \qquad \text{Eq. (1)}$$

where
$CDC_{new}$ is the new value of CSI channel duty cycle, and is constrained in the range (Minimum allowed CSI channel duty cycle)$\leq CDC_{new} \leq$(Maximum allowed CSI channel duty cycle)

$CDC_{old}$ is the previous value of the CSI channel duty cycle

CCHU is the utilization factor of the control channel $SCHU_{SCH}$ is the utilization factor of a given service channel N is a CSI channel weighting factor, and $M_{SCH}$ is a service channel weighting factor $\max[(M_{SCH}*SCHU_{SCH})$ is the maximum value from the set of products of the various service channel utilization factors and their respective weighting factors The effectiveness of the process depends on the estimation of the CSI channel and service channel utilization, and the setting of the weighting factors.

The CCHU estimation of utilization of the CSI channel is an estimate of the fraction of the CSI channel interval that is currently being used for transmissions, or is for some reason unavailable for data delivery. It can be estimated by direct monitoring of the CSI channel by the channel controller during the CSI channel interval. In [3], a Clear Channel Assessment function is described that is suited to this purpose, although other mechanisms are also possible. An estimate that takes into account the recent history of the utilization (e.g., a weighted average) smoothes the results and provides a more satisfactory result.

The $SCHU_{SCH}$ estimation of utilization of the service channel is an estimate of the fraction of the service channel interval that is currently being used for transmissions, or is for some reason unavailable for data delivery, on a given service channel. Its estimation may be more challenging than that of the CCHU, since the channel controller may not be able to consistently monitor all active service channels. The invention can make use of any effective method or a combination thereof to estimate service channel loading. For example, some methods are described below.

$SCHU_{SCH}$ can be estimated by the channel controller similarly to CCHU, by directly monitoring the service channel during the service channel interval. Multiple service channels could be monitored within one interval, or individual service channels could be monitored in successive intervals.

$SCHU_{SCH}$ estimation can be performed by a designated participant operating on the service channel, and reported to the channel controller. For example the initiator of a service set could monitor service channel loading during each service channel interval, and periodically report the results to the channel controller for use in the calculation of the CSI channel duty cycle.

The channel controller could also base its estimate on predefined data/information, such as knowledge that a supported application service typically consumes X % of the channel under Y % duty cycle. The estimated loading value could be stored as configuration data, could be retrieved from a remote data base, or could be reported to the channel controller by the initiator of the service set.

An example of service channel utilization parameter encoded with 5 bits is shown in Table 2 below. Other encodings could be used; for example 8 bits would allow granularity of 1% rather than 5%.

TABLE 2

Example of Service Channel Utilization Encoding using 5 Bits

| Service Channel Utilization Parameter Value | SCHU |
|---|---|
| 0 | 0% |
| 1 | 5% |
| 2 | 10% |
| 3 | 15% |
| 4 | 20% |
| 5 | 25% |
| 6 | 30% |
| 7 | 35% |
| 8 | 40% |
| 9 | 45% |
| 10 | 50% |
| 11 | 55% |
| 12 | 60% |
| 13 | 65% |
| 14 | 70% |
| 15 | 75% |
| 16 | 80% |
| 17 | 85% |
| 18 | 90% |
| 19 | 95% |
| 20 | 100% |

CSI channel weighting factor N is a parameter that controls how much the CSI channel loading (CCU) affects the CSI channel duty cycle. Some suggested experimental values are in the range of 0.05 to 0.25. With a default of N=0.1, for example, a previous CSI channel duty cycle $CDC_{old}$=50%, a service channel loading SCHU=0, and CSI channel loading CCHU=100%, the CSI channel duty cycle $CDC_{new}$ would increase to 60%.

Service channel weighting factor $M_{SCH}$ is a parameter that controls how much a service channel loading (SCHU) affects the CSI channel duty cycle. Two factors influence the choice of its value. First, each service set has an associated priority level, which is related to the priority of the associated application service. Second, in general, CSI channel traffic takes precedence over service channel traffic. These characteristics imply that $M_{SCH}$ should be variable by service channel and correlated to service set priority, and in general less than N. The highest priority service set might produce an M value equal to the N value of the control channel; other priorities would result in successively lower M values, until the lowest priority service set would produce an M value a small fraction (e.g., less than ½) of N.

Figure 7:
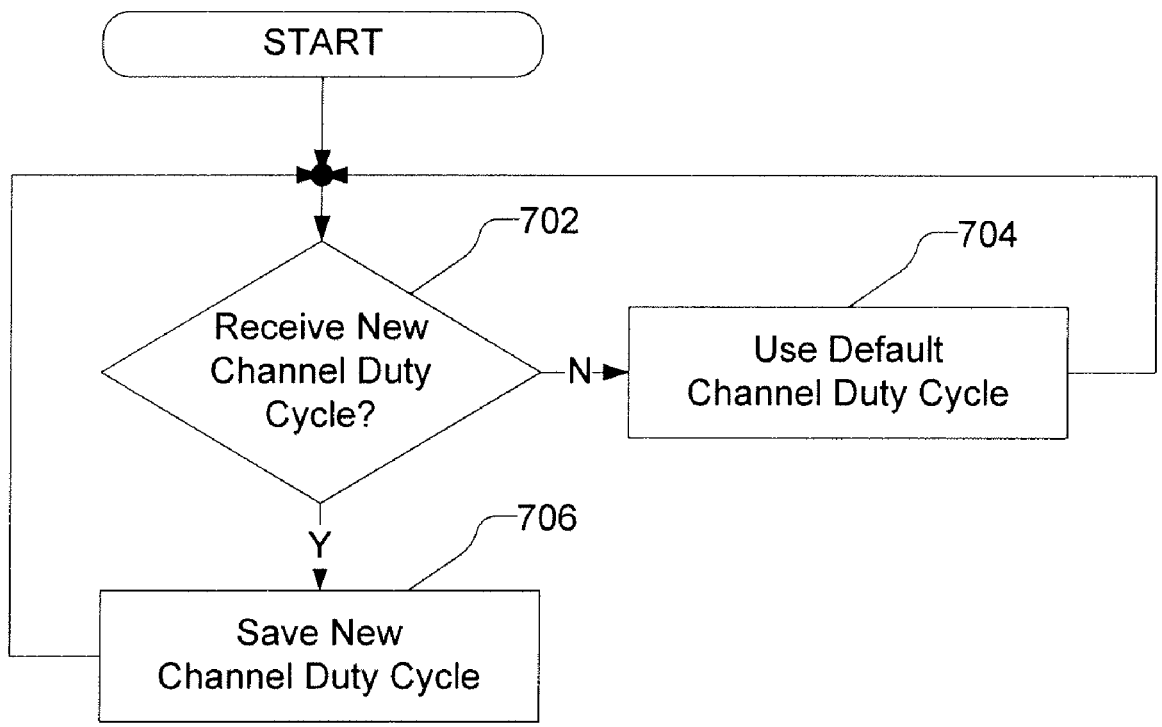
FIG. 7. depicts exemplary process performed by a participant device, according to some embodiments of the present invention.

An exemplary participant device operation is illustrated in FIG. 7. Upon receipt of an advertisement containing a CSI channel duty cycle parameter (block 706), the participant device saves it for use in any service set on which it operates. If no CSI channel duty cycle is received, as determined in block 702, the participant device reverts to a default value, as shown in block 704.

Some embodiments of a centralized version of the invention include one or more of the following characteristics.

1. An adaptive channel switching process for improving communications system performance, by adjusting channel switch timing, controlled by the channel controller (e.g., roadside unit).
2. The channel switching times are included in the channel controller's service advertisement.
3. The channel switching times are announced in terms of duty cycle.
4. The channel controller uses the following to calculate the switching times:
    configuration parameters entered into the system setting limits on the range of the allowed duty cycle values, e.g., maximum allowable CSI channel response time
    utilization of CSI channel capacity
    utilization of service channel capacity
    where higher CSI channel utilization tends to increase the CSI channel duty cycle, and increased service channel utilization tends to decrease the CSI channel duty cycle.

Some embodiments may incorporate any of the following steps or a combination thereof.

Participants requesting a service set may include a request for an allocation of capacity (e.g., 40% service channel duty cycle), which is then incorporated into the channel controller's calculation of the CSI channel duty cycle.

The channel controller may guarantee the veracity of the announced CSI channel duty cycle parameter via a digital signature or similar security method, which is verified by the participants before acting on the parameter.

Rather than adding the CSI channel duty cycle parameter to an existing advertisement message, a new message or messages may be designed for this purpose.

The channel controller may announce the channel switching time in terms of absolute timing relative to the start of a synchronization interval, rather than as a duty cycle.

Channel utilization may be averaged over time before use in the CSI channel duty cycle calculation, to smooth out short terms variations.

Predefined service priorities may be used to affect the CSI channel duty cycle. Services with higher priority tend to receive higher service channel duty cycles for their traffic.

Service priorities announced by the service set initiator may be used to affect the CSI channel duty cycle. Services with higher priority tend to receive higher service channel duty cycles for their traffic.

The operation of the system may employ a physical layer conforming to that described in [3].

The channel controller role may be performed by a roadside unit and participant role may be performed by vehicular onboard units. Alternately the controller role may be assumed by a vehicular onboard unit.

Channel utilization may be estimated by the channel controller monitoring radio activity on the channel.

Channel utilization may be estimated by a participant monitoring radio activity on the channel and reporting the result to the channel controller.

Channel utilization may be estimated based on preconfigured parameters related to the services supported.

Channel utilization may be estimated on a combination of two or more of the above.

In distributed embodiments, each active service set uses an individual service channel interval with a value that satisfies its quality of service requirement, but not to exceed the maximum allowed service channel interval. The initiator of the service set estimates a service channel interval value that will satisfy its requirements when initiating the service set, and broadcasts this in its advertisement of the service set. It can subsequently adjust the service channel interval based on observed service channel loading. The maximum service channel duty cycle (equal to 100% minus the CSI channel duty cycle) is set to a pre-configured value. The service channel interval could be added to an existing broadcast service advertisement message, with the service channel interval coded as an integer number of milliseconds. Alternately, different coding could be used or the parameter transmitted in a new message.

The distributed embodiments do not depend on the presence of a channel controller device, or the channel controller's ability to accurately monitor multiple service channels (while possibly performing communications services on one of them). Also, the distributed methods may incorporate CSI channel utilization monitoring and possibly, service set priority into the service channel interval calculation, so that a low priority service set would cede some of its capacity to the CSI channel, if the CSI channel became heavily loaded. In this case, the initiator of the service set performs a calculation very similar to that in Eq. (1).

Some embodiments of a distributed version of the present invention may include one or more of the following characteristics.

1. An adaptive channel switching method for improving communications system performance, by adjusting channel switch timing, controlled by individual service set initiating devices within predefined constraints.
2. The service set initiator may announce a service set-level parameter specifying time/duty cycle to be used by that service set. The parameter is in the service advertisement. The number is based on a priori expected channel usage.
3. The channel switching times may be announced in terms of duty cycle.
4. The announced service set times may not exceed a predefined threshold.

Variants of the distributed embodiment incorporate any of the following steps or a combination thereof.

The service channel interval value may be calculated by the service set initiator based on monitoring the actual channel usage.

The channel switching time may be announced in terms of absolute timing rather than of duty cycle.

The duty cycle calculation may take into account CSI channel utilization.

The duty cycle calculation may take into account service priority.

The operation of the system may employ a physical layer conforming to [3].

Hybrid embodiments of the adaptive channel interval invention employ the methods described for both the centralized and distributed modes of operation. Individual service set initiator devices select the service channel interval appropriate for their service set as in the distributed mode. The difference is that the maximum service channel interval, rather than being predefined, is determined by the channel controller as described for the centralized method. Instead of a general CSI channel duty cycle, the result of Eq. (1) is interpreted as the minimum CSI channel duty cycle. Since the CSI channel duty cycle equals (100% minus service channel duty cycle) and a channel duty cycle is easily converted to a time duration, the parameter could be announced in the form of a duty cycle (percent), in the form of time (milliseconds), or in another equivalent representation.

Some embodiments of a hybrid version of the system may include one or more of the following characteristics.

1. An adaptive channel switching method for improving WAVE system performance, by adjusting channel switch timing, controlled by individual service set initiating devices within constraints set by the channel controller.
2. The channel controller broadcasts channel duty cycle limitations.
3. The service set initiator announces a service set-level parameter specifying time/duty cycle to be used by that service set. The parameter is in the service advertisement. The number is based on a priori expected channel usage.
4. The channel switching times is announced in terms of duty cycle.
5. The announced service set times may not exceed the limitations broadcast by the channel controller.

Variants of the hybrid embodiment may incorporate the alternate steps identified for the other embodiments.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for data transmission to a plurality of units on wireless discontinuous channels including a control/safety information (CSI) channel having a duty cycle, and a plurality of service channels, the method comprising:

evaluating channel utilization of one or more of the wireless discontinuous channels by directly monitoring the one or more wireless discontinuous channels;

calculating a single optimal CSI channel duty cycle responsive to the channel utilizations, wherein the single optimal CSI channel duty cycle is shared by all of the plurality of units to transmit data;

adjusting the duty cycle of the CSI channel to the calculated single optimal CSI channel duty cycle to be shared by all of the plurality of units to transmit data;

broadcasting the single optimal CSI channel duty cycle to all of the plurality of units; and transmitting data according to the single optimal CSI channel duty cycle.

2. The method of claim 1, wherein the wireless discontinuous channels are discontinuous due to switching to a different radio channel.

3. The method of claim 1, wherein the wireless discontinuous channels are discontinuous due to predetermined system access constraints.

4. The method of claim 1, wherein the single optimal CSI channel duty cycle is broadcast in a service advertisement.

5. The method of claim 1, wherein evaluating channel utilization comprises evaluating channel utilization based on one or more of configuration parameters manually entered, data on the recent utilization of the CSI channel, data on the recent utilization of the service channels, current service channel allocation requests from applications, and relative priority of services on the CSI channel and the service channels.

6. The method of claim 1, further comprising imposing limits on the single optimal CSI channel duty cycle.

7. The method of claim 1, further comprising increasing the single optimal CSI channel duty cycle based on a high utilization of the CSI channel.

8. The method of claim 1, further comprising decreasing the single optimal CSI channel duty cycle based on a high utilization of one or more of the service channels.

9. The method of claim 1, further comprising estimating the channel utilization of the CSI channel based on an estimate of a fraction of a CSI channel interval that is currently being used for transmissions or is currently being unavailable for data delivery.

10. The method of claim 9, wherein estimating the channel utilization of the CSI channel comprises directly monitoring the CSI channel during the CSI channel interval.

11. The method of claim 1, further comprising estimating the channel utilization of a service channel based on an estimate of a fraction of a service channel interval that is currently being used for transmissions or is currently being unavailable for data delivery.

12. The method of claim 11, wherein estimating the channel utilization of the service channel comprises one or more of the steps: directly monitoring the service channel during a service channel interval, monitoring service channel loading during each service channel interval, and utilizing predefined information.

13. A system for data transmission on wireless discontinuous channels including a control/safety information (CSI) channel having a duty cycle, and a plurality of service channels, comprising:
    a channel controller device including a first processor and a first memory configured to evaluate channel utilization of one or more of the wireless discontinuous channels, calculate a single optimal CSI channel duty cycle responsive to the channel utilizations, adjust the duty cycle of the CSI channel to the calculated single optimal CSI channel duty cycle, and broadcast the single optimal CSI channel duty cycle; and
    a plurality of participant devices, each participant device including a second processor and a second memory configured to receive the broadcast single optimal CSI channel duty cycle and transmit data during the single optimal CSI channel duty cycle, wherein the channel controller device is configured to evaluate the channel utilization by directly monitoring the one or more channels.

14. The system of claim 13, wherein the wireless discontinuous channels are discontinuous due to switching to a different radio channel.

15. The system of claim 13, wherein the wireless discontinuous channels are discontinuous due to predetermined system access constraints.

16. The system of claim 13, wherein the channel controller device is configured to broadcast the single optimal CSI channel duty cycle in a service advertisement.

17. The system of claim 13, wherein the channel controller device is further configured to evaluate channel utilization based on one or more of configuration parameters manually entered, data on the recent utilization of the CSI channel, data on the recent utilization of the service channels, current service channel allocation requests from applications utilizing the system, and relative priority of services on the CSI channel and the service channels.

18. The system of claim 13, wherein the channel controller device is further configured to estimate the channel utilization of the CSI channel based on an estimate of a fraction of a CSI channel interval that is currently being used for transmissions or is currently being unavailable for data delivery.

19. The system of claim 13, wherein the channel controller device is located in a roadside unit.

20. The system of claim 13, wherein the channel controller device is located in a vehicular onboard unit.

21. A method for adaptive channel switching in a Wireless Access in a Vehicular Environments (WAVE) system including a control/safety information (CSI) channel and a plurality of service channels, the method comprising:
    calculating optimal channel switch timings for a plurality of mobile units, based on recent history utilization of the CSI channel and recent history utilization of the plurality of service channels;
    broadcasting the calculated optimal channel switching times to all of the plurality of mobile units, in a service advertisement;
    adjusting channel switch timings to the calculated optimal channel switch timings to be shared by all of the plurality of mobile units to transmit data; and
    transmitting data according to the optimal channel switch timings.

22. The method of claim 21, further comprising estimating the channel utilization of the CSI channel based on an estimate of a fraction of a CSI channel interval that is currently being used for transmissions or is currently being unavailable for data delivery.

23. The method of claim 21, further comprising estimating the channel utilization of a service channel based on one or more of the steps: directly monitoring the service channel during a service channel interval, monitoring service channel loading during each service channel interval, and utilizing predefined information.

* * * * *